United States Patent
Vijayarangan et al.

(10) Patent No.: US 8,788,552 B2
(45) Date of Patent: Jul. 22, 2014

(54) DETERMINISTIC RANDOM NUMBER GENERATOR FOR CRYPTOGRAPHY AND DIGITAL WATERMARKING

(75) Inventors: Natarajan Vijayarangan, Andhra Pradesh (IN); Rao Chalamala Srinivasa, Andhra Pradesh (IN)

(73) Assignee: Tata Consultancy Services Ltd. (IN)

( * ) Notice: Subject to any disclaimer, the term of this patent is extended or adjusted under 35 U.S.C. 154(b) by 1201 days.

(21) Appl. No.: 12/319,886

(22) Filed: Jan. 12, 2009

(65) Prior Publication Data

US 2009/0193065 A1 Jul. 30, 2009

(30) Foreign Application Priority Data

Jan. 25, 2008 (IN) .......................... 185/MUM/2008

(51) Int. Cl.
*G06F 7/58* (2006.01)
(52) U.S. Cl.
CPC .............. *G06F 7/582* (2013.01); *G06F 7/584* (2013.01)
USPC ........................................................ 708/252
(58) Field of Classification Search
None
See application file for complete search history.

(56) References Cited

U.S. PATENT DOCUMENTS

| | | | | |
|---|---|---|---|---|
| 5,258,936 A * | 11/1993 | Gallup et al. | ................. | 708/254 |
| 5,566,099 A * | 10/1996 | Shimada | ........................ | 708/250 |
| 6,647,054 B1 * | 11/2003 | Greenhoe | ..................... | 375/140 |
| 7,082,449 B2 * | 7/2006 | Rarick | ........................... | 708/250 |
| 7,206,797 B2 * | 4/2007 | Gressel et al. | ................ | 708/250 |
| 7,412,057 B2 * | 8/2008 | Dagan et al. | .................. | 380/268 |
| 7,720,896 B2 * | 5/2010 | Luzzi et al. | ................... | 708/250 |
| 7,852,162 B2 * | 12/2010 | Gressel et al. | .................. | 331/78 |
| 7,895,251 B2 * | 2/2011 | Ishikawa | ....................... | 708/252 |
| 8,019,802 B2 * | 9/2011 | Rose et al. | ..................... | 708/254 |
| 8,122,075 B2 * | 2/2012 | Watanabe et al. | ............. | 708/250 |
| 8,213,611 B2 * | 7/2012 | Ungerboeck et al. | ........... | 380/46 |
| 2003/0016823 A1 * | 1/2003 | Chung | ............................ | 380/46 |
| 2004/0049526 A1 * | 3/2004 | Joye et al. | ..................... | 708/250 |
| 2006/0047735 A1 * | 3/2006 | Nunes | ........................... | 708/250 |
| 2007/0174374 A1 * | 7/2007 | Inoha | ............................. | 708/252 |
| 2007/0244951 A1 * | 10/2007 | Gressel et al. | ................ | 708/252 |
| 2009/0154700 A1 * | 6/2009 | Sibert et al. | ................... | 380/268 |

\* cited by examiner

*Primary Examiner* — Lewis A Bullock, Jr.
*Assistant Examiner* — Christine Dang
(74) *Attorney, Agent, or Firm* — Robert Plotkin, P.C.

(57) ABSTRACT

A deterministic random number generator includes a number series generator adapted to generate an infinite Pi series, a summation generator adapted to generate a partial sum of said infinite Pi series, a computer adapted to compute a finite sequence from said partial sum of infinite Pi series, a shuffler adapted to shuffle said computed finite sequence to obtain a shuffled sequence, a masker adapted to mask said shuffled sequence to obtain a masked sequence, a non-linear function processor adapted to process said masked sequence to obtain a non-linear processed sequence, and a linear feedback shift register adapted to receive and shift bits of said non-linear processed sequence in a pre-determined manner to obtain a deterministic random number and a method for generating a deterministic random number for cryptography and watermarking.

16 Claims, 5 Drawing Sheets

DETERMINISTIC RANDOM NUMBER GENERATOR FOR CRYPTOGRAPHY AND DIGITAL WATERMARKING

FIELD OF INVENTION

Figure 1:
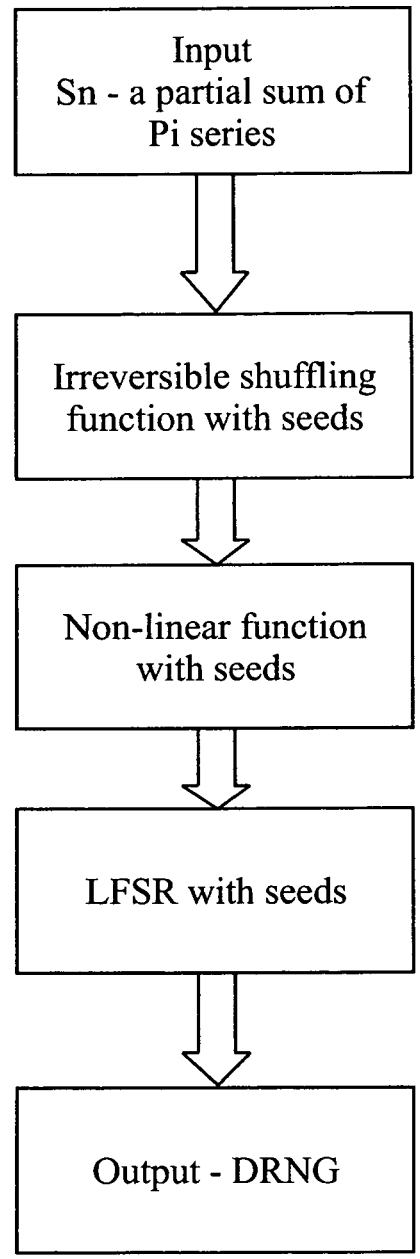

The present invention is in the field of Cryptography and Digital Watermarking. The invention pertains to design of a new deterministic random number generator (DRNG) to produce cryptographically secure and robust watermarking sequences.

BACKGROUND OF INVENTION

Cryptography and Image watermarking are filled with apparent oxymora and paradoxes. Random sequences are used as keys to encrypt information to be used as watermark during embedding the watermark and also to extract the watermark during detection. Therefore a deterministic random number sequence is very much useful for watermarking applications. In order to obtain the same random number sequence, we need to pass the same seed to the generator.

Many researchers have used DRNG for cryptographic applications and Pseudo Noise Random sequence (PN) for watermarking. Even though, there are some weaknesses in PN due to attacks, the research community used it mostly in digital watermarking. On the other hand, DRNG has not been widely used in watermarking due to its computational complexity and non-robustness. Therefore, we have invented a new design of generating DRNG using Pi-series to make it useful for Cryptographic and Digital watermarking applications.

PRIOR ART

The present invention provides a tool to design a new deterministic random number generator (DRNG), which is cryptographically secure and robust in terms of watermarking.

U.S. Pat. No. 6,862,605 by Wilber, Scott A. et al discloses true random number generator and entropy calculation device and method. This random number generator includes a first oscillator that provides a first oscillatory signal to a processor, and a second oscillator that provides a signal to a frequency multiplier, which in turn provides a second oscillatory signal to the processor. The relative jitter between the two oscillatory signals contains a calculable amount of entropy that is extracted by the processor to produce a sequence of true random numbers.

U.S. Pat. No. 6,215,874 by Borza, Stephen J. Freedman, Gordon et al discloses a method and system of generating random numbers using imaging transducers of a charge coupled array. Noise signals detected by a first and a second imaging transducers of the array are processed together to yield a first value; noise signals detected by a third and a fourth imaging transducers are processed together to yield a second value; the first and second values are processed together to yield the random number.

United States Patent 20050098945 by Carter, Michael L. et al discloses an apparatus for generating random indicia sequences.

U.S. Pat. No. 5,057,795 by William M. Hawthorne et al discloses a pseudo-random sequence generator characterized by comprising a plurality of substantially similar elements adapted to operate in parallel.

United States Patent 20070165848 by Reyes, Sergio et al discloses Lightweight pseudo-random number generator.

U.S Pat. No. 6,533,664 by Hardy Lee Crumby et al discloses gaming system with individualized centrally generated random number generator seeds.

U.S. Pat. No. 6,101,602 by Fridrich, Jiri et al discloses digital watermarking by adding random, smooth patterns.

U.S. Pat. No. 7,099,493 by Hirofumi Muratani et al discloses digital watermarking device and method thereof.

None of the above mentioned patents/patent applications provide for a secure, fool proof, or have increased entropy so that it can be used in a watermarking technique in a manner such that its deconstruction is extremely difficult.

SUMMARY OF INVENTION

According to this invention, there is provided a deterministic random number generator comprising:
number series generator adapted to generate an infinite Pi series;
summation means adapted to generate a partial sum of said infinite Pi series;
computation means adapted to compute a finite sequence from said partial sum of infinite Pi series;
shuffling means adapted to shuffle said computed finite sequence to obtain a shuffled sequence;
masking means adapted to mask said shuffled sequence to obtain a masked sequence;
non-linear function means adapted to process said masked sequence to obtain a non-linear processed sequence; and
linear feedback shift register means adapted to receive and shift bits of said non-linear processed sequence in a pre-determined manner to obtain a deterministic random number.

Typically, said number series generator is a Leibniz Pi series generator.

The Deterministic Random Number Generator (DRNG) in accordance with this invention is based on Leibniz Pi series that is secure and robust and it is useful for Cryptographic and Digital watermarking applications. Initially, there is taken a finite sequence $S_n$ from a partial sum of Leibniz Pi infinite series $(\Sigma(-1)^{(n+1)}/(2n-1)$, where $n=1,2,\ldots)$. In order to achieve the randomness, the sequence $S_n$ is passed into a layer of 3 operations: Irreversible shuffling, Non-linear function and LFSR. In each operation, the entropy of $S_n$ increases. After passing $S_n$ through all three operations, the output satisfies statistical tests of randomness. Since the entire flow of operations is not bijective, it is difficult to predict $S_n$ from the given output. Therefore, the output is random as well as secure. Some statistical properties of DRNG using Leibniz Pi and PN sequences have been observed and analyzed. Since the proposed scheme performs well in terms of correlation and randomness properties, it is recommended to use the proposed DRNG in Spread spectrum based Digital watermarking techniques as well as Cryptographic applications.

Alternatively, said number series generator is a Ramanujan Pi series generator.

Analogously, Ramanujan Pi value instead Leibniz Pi have been attempted in the invented DRNG and then the performance and outcomes are also good. Typically, said computation means includes a selection means to extract a finite sequence.

Typically, said shuffling means includes a shuffling mechanism having a pre-defined seed operator.

Typically, said seed operator of said shuffling means is selected from a group of seed operators consisting of primitive polynomials, prime numbers, and both primitive polynomials and prime numbers.

Typically, said masking means is a one-way masking means.

Typically, said non-linear function means includes a pre-defined seed operator.

Typically, said pre-defined seed operator of said non-linear function means is selected from a group of seed operators consisting of prime numbers, user-defined values, and polynomial functions.

Typically, said linear feedback shift register includes a pre-defined seed operator.

Typically, said pre-defined seed operator of said linear feedback shift register is a primitive polynomial.

In accordance with a preferred embodiment of this invention the method and a system comprises 4 operations in a sequential order: A) Selecting $S_n$ from Pi series B) Irreversible Shuffling function C) Non-linear function and D) LFSR.

Typically, said method comprises the steps of:
generating an infinite Pi series;
computing a partial sum of said infinite Pi series;
computing a finite sequence from said partial sum of infinite Pi series;
shuffling said computed finite sequence to obtain a shuffled sequence;
masking said shuffled sequence to obtain a masked sequence;
processing said masked sequence to obtain a non-linear processed sequence; and
shifting bits of said non-linear processed sequence in a pre-defined manner to obtain a deterministic random number.

Typically, said step of generating an infinite Pi series includes the step of generating a Leibniz Pi series.

Alternatively, said step of generating an infinite Pi series includes the step of generating a Ramanujan Pi series.

Typically, said step of computing a finite sequence from said partial sum of infinite Pi series includes the step of selecting said finite sequence.

Typically, said step of shuffling said computed finite sequence to obtain a shuffled sequence includes the step of shuffling in accordance with a pre-defined seed operator.

Typically, said step of masking said shuffled sequence to obtain a masked sequence includes the step of one-way masking.

Typically, said step of processing said masked sequence to obtain a non-linear processed sequence includes the step of non-linear processing in accordance with a pre-defined seed operator.

Typically, said step of shifting bits of said non-linear processed sequence in a pre-defined manner to obtain a deterministic random number includes the step of shifting in accordance with a pre-defined seed operator.

Typically, the operation A computes a finite sequence $S_n$ from a partial sum of infinite Pi series. The operation B has one-way functions and it cannot be deshuffled. The operation C is not bijective and the operation D is bijective w.r. to the primitive polynomial used in LFSR as well as output of LFSR.

In one embodiment of the invention, the process A→B→C→D is not bijective.

Particularly, Ramanujan Pi series are used and tested in the method and system in accordance with this invention.

Particularly, the system in accordance with this invention performs better than PN sequence.

Particularly, the seeds of this system are secure and is suitable for Information security and Digital watermarking applications.

BRIEF DESCRIPTION OF THE ACCOMPANYING DRAWINGS

Figure 2:
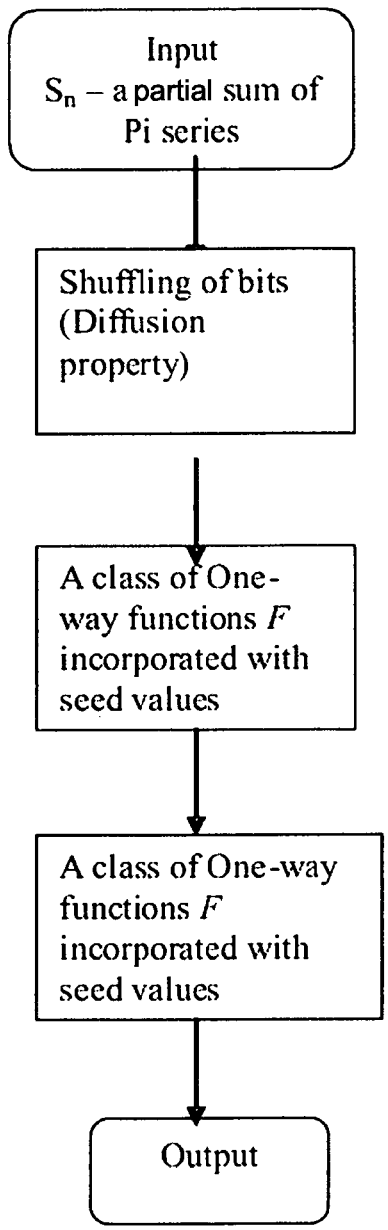
Figure 3:
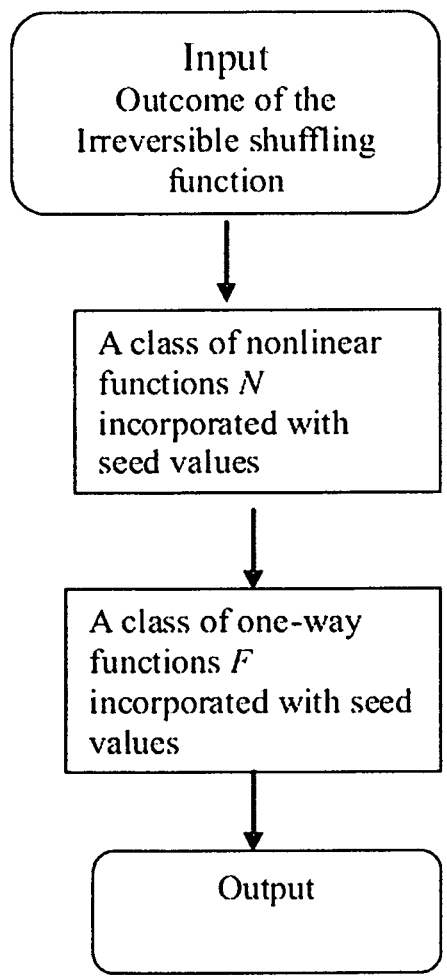
Figure 4:
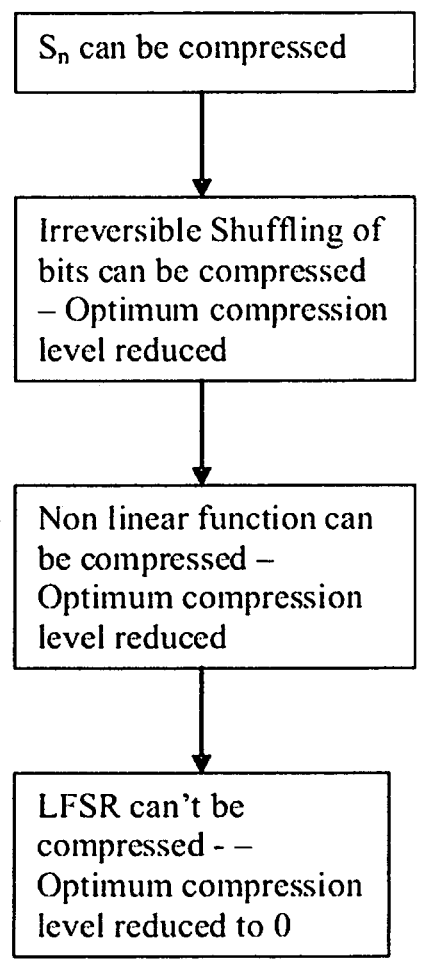
Figure 5:
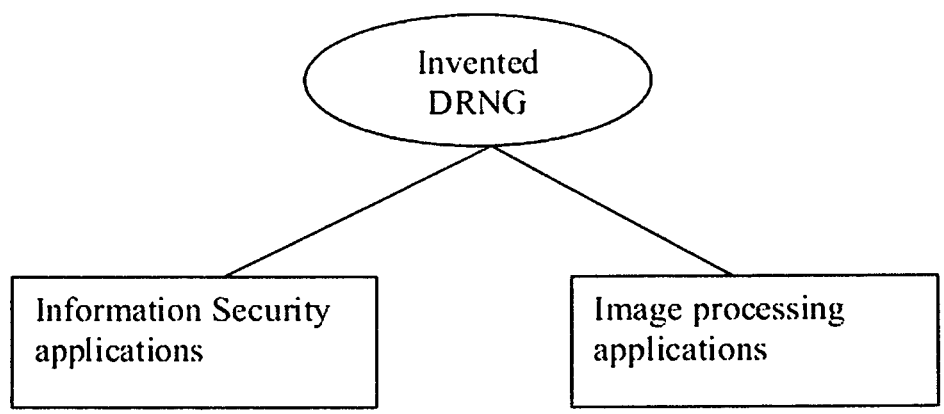

The invention is described with reference to the accompanying drawings in which;
FIG. 1 shows Invented DRNG process;
FIG. 2 shows Irreversible shuffling process;
FIG. 3 shows Non linear process;
FIG. 4 shows compression level of the invented DRNG; and
FIG. 5 shows applications of the invented DRNG.

DETAILED DESCRIPTION OF INVENTION

The methods and/or systems by which a deterministic random number sequence is generated are now described. The invention discloses a new DRNG process used to compute and generate a random sequence that is suitable for cryptographic and digital watermarking applications. The invented DRNG process consists of 4 operations: Selecting $S_n$ from Pi series, Irreversible shuffling, Non-linear function and LFSR. Each operation is explained as follows.

A number series generator generates an infinite Pi series. The further processes and means are explained below:

Selecting $S_n$ from Pi Series

A finite sequence $S_n$ (from a computation means) is selected from a partial sum (generated by summation means) of infinite Pi series $\Sigma a_i$ where n is as per the requirement of random numbers and each $S_n$ consists of higher order decimal values. Then a sequence S is obtained where $S=\{S_1, S_2, \ldots, S_n\}$ for a large size n so that $S_n$ converges to Pi value as $n\to\infty$ (where $S_n=a_1+a_2+\ldots+a_n$).

For instance, the inventors have implemented and analyzed using a finite sequence $S_n$ from a partial sum of Leibniz or Ramanujan Pi infinite series.

Leibniz Pi series means $\pi/4=\Sigma(-1)^{(n+1)}/(2n-1)$, where $n=1,2,\ldots$

Ramanujan Pi series means $1/\pi=(\sqrt{8}/9801)\Sigma(p(n)/q(n))$, where $p(n)=(4n)! (1103+26390 n)$, $q(n)=(n!)^4 396^{4n}$ and $n=1,2,\ldots$ Irreversible Shuffling of Bits The Shuffling function (by the shuffling means) takes $S_n$ as input and shuffles the bits of $S_n$ followed by a one-way masking. The one-way masking function (like discrete logarithm/ integer factorization) is used in shuffling function, so that it cannot be de-shuffled. Hence the inverse of the shuffling cannot be easily accomplished. It follows that the shuffling function is cryptographically secure. Due to diffusion property of the shuffling function, the output gets random. Moreover, two seed values are used in the shuffling function: First seed is based on primitive polynomials and second seed on prime numbers. Users supply both seeds during the execution of shuffling operations.

For example, the input x is shuffled and transformed in the following manner. Here, the seed values are 0xFBDB1169 (32-bit primitive polynomial) and 0xFFFFFFFB (prime number).

Step 1
y=(x & 0x0000FF00)<<8|(x>>8) & 0x0000FF00|x & 0xFF0000FF;
y=(y & 0x00F000F0)<<4|(y>>4) & 0x00F000F0|y & 0xF00FF00F;
y=(y & 0x0C0C0C0C)<<2|(y>>2) & 0x0C0C0C0C|y & 0xC3C3C3C3;
y=(y & 0x22222222)<<1|(y>>1) & 0x22222222|y & 0x99999999;

Step 2
z=((x)&(y))& 0xFBDB1169;
z=(z & 0x0000FF00)<<8|(z>>8) & 0x0000FF00|z & 0xFF0000FF;
z=(z & 0x00F000F0)<<4|(z>>4) & 0x00F000F0|z & 0xF00FF00F;
z=(x & 0x0C0C0C0C)<<2|(x>>2) & 0x0C0C0C0C|z & 0xC3C3C3C3;
z=(x & 0x22222222)<<1|(z>>1) & 0x22222222|z & 0x99999999;
Step 3
x=x$^z$ mod 0xFFFFFFFB;
Non-Linear Function The output of the shuffling function is the input to the non-linear function (operated on the non-linear function means). Since the non-linear function diffuses the input, the entire sequence of bits increases entropy. Given non-linear function is irreversible so that input and output cannot be correlated. Further, seed values could also be incorporated in the non-linear function in order to improve the strength of the function.

For example, consider $f(n)=((n^2+n+c)$ & 0xFFFFFFFF) where c is a constant value provided by users. Then compute $g(m)=(m^n)$ mod p, where m=f(n) and p is prime. The output g(m) and input n cannot be correlated and the entropy of g(m) is relatively higher than n. As we discussed two functions f(n) and g(m), users could consider the constant c and prime p as seeds.

LFSR (Linear Feedback Shift Register)

The output of the nonlinear function is given as input to the LFSR. Primitive polynomials over $GF(2^n)$ are useful in the design of LFSRs for generating sequences of maximum period. All generated primitive polynomials are highly dense as well as random (highly dense means more number of tabs used). In the LFSR operation, the given primitive polynomial acts as seed so that it is secure to generate different combination of sequence of bits.

Each time, the n-bits input is executed with a primitive polynomial of degree n and the linear shift process undergoes for different cycles. Thus, even if the input bits are identical, the output will be random.

For instance, the primitive polynomial used in LFSR is $x^{32}+x^{26}+x^{23}+x^{22}+x^{16}+x^{12}+x^{11}+x^{10}+x^8+x^7+x^5+x^4+x^2+x+1$ over $GF(2^{32})$. This is an irreducible polynomial of degree 32 whose period is $2^{32}-1$. Experimentally, it is tested that the output of LFSR round gets more random, when each 32-bit input is shifted with the given primitive polynomial for 4 to 15 cycles.

Inverse of LFSR can be obtained with respect to the same primitive polynomial used for LFSR as well as output of LFSR. Therefore LFRS is bijective. The inverse operation consumes a little bit time. For a large size of n, it is not an easy task to find the input from LFSR output without knowing a primitive polynomial employed in the LFSR operation.

Invented DRNG—Non Invertible

The invented DRNG is capable of producing a random sequence with high entropy. The process starts from $S_n$ that undergoes Irreversible shuffling, Non-linear and LFSR operations and produces the output as a deterministic random number sequence. It is theoretically and practically impossible to predict n and $S_n$ from a given random sequence due to nonlinear and one-way properties involved in the DRNG process.

The tool in accordance with this invention can be used in Cryptographic applications and Digitial watermarking. Unlike DRNG, the sequence PN can be realized by LFSR with Exclusive OR operations and is good for spread spectrum communications. When an attacker comes to know what kind of polynomial is used in the sequence PN, the input and output processes of PN could be judged—a vulnerable attack. Whereas in the invented DRNG, even the attacker comes to know the core operations in LFSR, it is difficult to judge the behavior of nonlinear and discreet logarithm properties involved in the DRNG process. Therefore, the invented DRNG is cryptographically secure and performs well in terms of robustness in watermarking applications due to its correlation properties.

Analysis of DRNG (Invented) and PN

PN possesses good Autocorrelation and Cross correlation properties. It is well suited for Digital Watermarking, but not for Cryptographic applications.

Sometimes, the PN sequences may not have good entropy values. Whereas the invented DRNG performs well in terms of Autocorrelation, Cross Correlation, Entropy, Compression, Frequency, Arithmetic Mean, Serial Correlation, Chi square distribution and Monte Carlo value tests.

The Invented DRNG is Compared with PN and Alternating Sequences.

TABLE 1

Comparison of different sequences

| Alternating sequence | Invented DRNG | PN |
|---|---|---|
| The sequence follows a pattern | No pattern | No pattern |
| Not random | Random | Random |
| Not at all secure | Secure for Cryptographic and watermarking applications | Secure for watermarking applications. It can be used for Cryptographic applications with risk. |
| Suitable for spread spectrum based digital watermarking application | Suitable for spread spectrum based digital watermarking applications | Suitable for spread spectrum based digital watermarking application. |
| Recovery of watermarked image is good with error level 2-3% | Recovery of watermarked image is good with error level 5-6% | Recovery of watermarked image is good with error level 8-9% |
| Image smoothness is good | At par | At par |

Implementation Results:

Entropy and randomness tests have been performed on the input and output files of the invented DRNG. The entropy of the output file is at maximum level (7.9 per byte) and it was always higher than that of the corresponding input file.

The following results are analyzed using Statistical tests on the input and output files of the invented DRNG.
Result 1:
Using Leibniz Pi series of file size 192 KB
Statistical Results of Input File
Entropy=4.310153 bits per byte.
Optimum compression would reduce the size of this 200000 byte file by 46 percent.
Chi square distribution for 200000 samples is 10209131.42, and randomly would exceed this value 0.01 percent of the times.
Arithmetic mean value of data bytes is 68.1466 (127.5=random).
Monte Carlo value for Pi is 3.628716287 (error 15.51 percent).
Serial correlation coefficient is 0.355382 (totally uncorrelated=0.0).
Statistical Results of Output File
Entropy=7.999012 bits per byte.

Optimum compression would reduce the size of this 200000 byte file by 0 percent.
Chi square distribution for 200000 samples is 274.08, and randomly would exceed this value 25.00 percent of the times.
Arithmetic mean value of data bytes is 127.5066 (127.5=random).
Monte Carlo value for Pi is 3.129871299 (error 0.37 percent).
Serial correlation coefficient is -0.003409 (totally uncorrelated=0.0).
Result 2:
Using Leibniz Pi series of file size 391 KB
Statistical Results of Input File
Entropy=4.330900 bits per byte.
Optimum compression would reduce the size of this 400000 byte file by 45 percent.
Chi square distribution for 400000 samples is 20325590.43, and randomly would exceed this value 0.01 percent of the times.
Arithmetic mean value of data bytes is 69.9801 (127.5=random).
Monte Carlo value for Pi is 3.630276303 (error 15.56 percent).
Serial correlation coefficient is 0.383419 (totally uncorrelated=0.0).
Statistical Results of Output File
Entropy=7.999509 bits per byte.
Optimum compression would reduce the size of this 400000 byte file by 0 percent.
Chi square distribution for 400000 samples is 272.38, and randomly would exceed this value 25.00 percent of the times.
Arithmetic mean value of data bytes is 127.5831 (127.5=random).
Monte Carlo value for Pi is 3.136291363 (error 0.17 percent).
Serial correlation coefficient is 0.001422 (totally uncorrelated=0.0).
Result 3:
Using Ramanujan Pi series of file size 128 KB
Statistical Results of Input File
Entropy=3.676774 bits per byte.
Optimum compression would reduce the size of this 130790 byte file by 54 percent.
Chi square distribution for 130790 samples is 2659228.87, and randomly would exceed this value 0.01 percent of the times.
Arithmetic mean value of data bytes is 48.9852 (127.5=random).
Monte Carlo value for Pi is 4.000000000 (error 27.32 percent).
Serial correlation coefficient is 0.267845 (totally uncorrelated=0.0).
Statistical Results of Output File
Entropy=7.998604 bits per byte.
Optimum compression would reduce the size of this 130792 byte file by 0 percent.
Chi square distribution for 130792 samples is 254.30, and randomly would exceed this value 50.00 percent of the times.
Arithmetic mean value of data bytes is 127.4260 (127.5=random).
Monte Carlo value for Pi is 3.166896046 (error 0.81 percent).
Serial correlation coefficient is 0.004917 (totally uncorrelated=0.0).

Result 4:
Using Ramanujan Pi series of file size 256 KB
Statistical Results of Input File
Entropy=3.659939 bits per byte.
Optimum compression would reduce the size of this 263188 byte file by 54 percent.
Chi square distribution for 263188 samples is 5377266.89, and randomly would exceed this value 0.01 percent of the times.
Arithmetic mean value of data bytes is 48.9443 (127.5=random).
Monte Carlo value for Pi is 4.000000000 (error 27.32 percent).
Serial correlation coefficient is 0.262759 (totally uncorrelated=0.0).
Statistical Results of Output File
Entropy=7.999243 bits per byte.
Optimum compression would reduce the size of this 263188 byte file by 0 percent.
Chi square distribution for 263188 samples is 275.66, and randomly would exceed this value 25.00 percent of the times.
Arithmetic mean value of data bytes is 127.6200 (127.5=random).
Monte Carlo value for Pi is 3.133229984 (error 0.27 percent).
Serial correlation coefficient is -0.000643 (totally uncorrelated=0.0).
Industrial Applications The invented DRNG described above finds a number of applications in Information Security and Digital watermarking. Some specific areas where our process can be applied are:
1. Session key generation
2. Signature protocols
3. Client-Server protocols
4. Encryption
5. Spread spectrum communications
6. Digital Signal Process While considerable emphasis has been placed herein on the particular features of the preferred embodiment and the improvisation with regards to it, it will be appreciated the various modifications can be made in the preferred embodiments without departing from the principles of the invention. These and the other modifications in the nature of the invention will be apparent to those skilled in art from disclosure herein, whereby it is to be distinctly understood that the foregoing descriptive matter is to interpreted merely as illustrative of the invention and not as a limitation.

The invention claimed is:

1. A deterministic random number generator comprising:
number series generator adapted to generate an infinite Pi series;
a summation generator adapted to generate a partial sum of said infinite Pi series;
a computer adapted to compute a finite sequence from said partial sum of infinite Pi series;
a shuffler adapted to shuffle said computed finite sequence, using a shuffling seed mechanism having a first pre-defined primitive polynomial seed operator and a second pre-defined prime number seed operator, to obtain a shuffled sequence;
a one-way masker adapted to apply a one-way masking function to said shuffled sequence to obtain a masked sequence;
a non-linear function processor adapted to irreversibly process said masked sequence to obtain a non-linear processed sequence so that said masked sequence and said non-linear processed sequence cannot be correlated; and a linear feedback shift register adapted to receive and shift bits of said non-linear processed sequence in a pre-determined manner to obtain a deterministic random number.

2. The deterministic random number generator as claimed in claim 1, wherein said number series generator is a Leibniz Pi series generator.

3. The deterministic random number generator as claimed in claim 1, wherein said number series generator is a Ramanujan Pi series generator.

4. The deterministic random number generator as claimed in claim 1, wherein said computer includes a selector to extract a finite sequence.

5. The deterministic random number generator as claimed in claim 1, wherein said non-linear function processor includes a pre-defined seed operator.

6. The deterministic random number generator as claimed in claim 1, wherein said non-linear function processor includes a pre-defined seed operator selected from a group of seed operators consisting of prime numbers, user-defined values, and polynomial functions.

7. The deterministic random number generator as claimed in claim 1, wherein said linear feedback shift register includes a pre-defined seed operator.

8. The deterministic random number generator as claimed in claim 1, wherein said linear feedback shift register includes a pre-defined seed operator which is a primitive polynomial.

9. A method for generating a deterministic random number for cryptography and watermarking, said method comprising the steps of:
generating an infinite Pi series;
computing a partial sum of said infinite Pi series;
computing a finite sequence from said partial sum of infinite Pi series;
shuffling said computed finite sequence, using a shuffling seed mechanism having a first pre-defined primitive polynomial seed operator and a second pre-defined prime number seed operator, to obtain a shuffled sequence;
applying a one-way masking function to said shuffled sequence to obtain a masked sequence;
irreversibly processing said masked sequence to obtain a non-linear processed sequence so that said masked sequence and said non-linear processed sequence cannot be correlated; and
shifting bits of said non-linear processed sequence in a pre-defined manner to obtain a deterministic random number.

10. The method as claimed in claim 9, wherein said step of generating an infinite Pi series includes the step of generating a Leibniz Pi series.

11. The method as claimed in claim 9, wherein said step of generating an infinite Pi series includes the step of generating a Ramanujan Pi series.

12. The method as claimed in claim 9, wherein said step of computing a finite sequence from said partial sum of infinite Pi series includes the step of selecting said finite sequence.

13. The method as claimed in claim 9, wherein said step of masking said shuffled sequence to obtain a masked sequence includes the step of one-way masking.

14. The method as claimed in claim 9, wherein said step of irreversibly processing said masked sequence to obtain a non-linear processed sequence includes the step of non-linear processing in accordance with a pre-defined seed operator.

15. The deterministic random number generator of claim 1, wherein the one-way masking function comprises at least one of a discrete logarithm function and an integer factorization function.

16. The method of claim 9, wherein the one-way masking function comprises at least one of a discrete logarithm function and an integer factorization function.

* * * * *